June 21, 1932.  E. P. BARCLAY  1,863,823
COUPLER
Original Filed Nov. 28, 1928
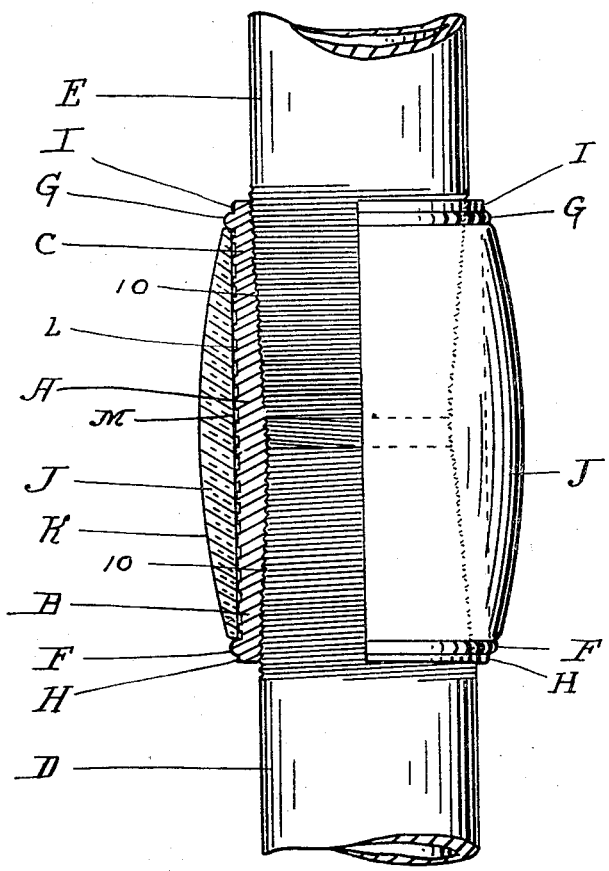
Inventor:
Edward Paul Barclay.
by: Bradbury & Caswell
Attorneys.

Patented June 21, 1932

1,863,823

UNITED STATES PATENT OFFICE

EDWARD PAUL BARCLAY, OF LOS ANGELES, CALIFORNIA

COUPLER

Application filed November 28, 1928, Serial No. 322,560. Renewed November 6, 1931.

My invention relates to improvements in couplings and particularly, although not exclusively to that class by which the ends of sections of a drill shaft are joined. The primary object is to provide the coupling with means by which it and its connected elements are protected to prevent the coupling and its connected elements from damaging casing or other contiguous elements in or near which the shaft is revolved or reciprocated and against which the joint rubs or strikes while the shaft is operating. This striking and rubbing of the shaft against the casing prevails when the shaft is employed for drilling wells. Another object is to provide the coupling with a protecting jacket by which friction against a casing is reduced to a minimum. A further object is to incorporate the joint and the projecting element into a unitary structure, by which damage to the protecting jacket is reduced to a minimum. A still further object is to provide a protected joint which can easily be connected with or disconnected from the sections of a drill shaft without the use of any means other than the ordinary tools which are employed for coupling or uncoupling sections of drill shafts. An important object of my invention is to provide a protective coupling for tubular sections comprising a collar having external annular flanges near its ends and grooves formed on and encircling its periphery intermediate the flanges, and a rubber band vulcanized onto said collar between said flanges and having end portions substantially corresponding in diameter to that of the flanges for the purpose of protecting the ends of the resilient band against damage when a pipe embodying said coupling is raised or lowered in a well.

Another object is to provide a resilient buffer on the coupling having end portions of substantially less diameter than the central portion thereof so as to provide a central bearing portion for the coupling which will contact the sides of a casing, as in an oil well, at different points.

In the accompanying drawing, forming part of this specification, the figure is a side elevation of my improved coupling, partly in section, showing connected portions of two adjacent sections of a drill shaft.

In the drawing, A indicates a sleeve made out of metal or other suitable material having inwardly tapering ends B and C, threaded internally at 10, in the usual manner to receive the threaded ends of two sections D and E of a drill shaft, in the usual manner to form a detachable coupling therefor. The outer surface of the sleeve is formed with annular flanges F and G near but preferably distanced from the extremities, leaving flat annular surfaces H and I to which a wrench or other tool can be applied for assistance in screwing the sections of the shaft in the coupling. A resilient jacket or band J is secured to the surface of the sleeve by vulcanizing or cementing, said jacket being formed with a crowned surface K between its ends or being of any other suitable shape desired for the purpose of providing an outstanding protector on the joint for relieving or absorbing impact and friction of the joint and shaft against the wall of the casing or other object in or near which the shaft is revolved or reciprocated. To increase the strength of connection between the resilient jacket and metal sleeve, the surface of the sleeve is annularly grooved or threaded at L. The method of forming or securing the resilient jacket on the sleeve may be by molding the resilient jacket of rubber or other suitable material on the sleeve or the jacket may be first formed and then cemented on the sleeve, or the jacket can be constructed on the sleeve in the manner as desired within the spirit of my invention. As shown a thin surface M of gutta-percha is first placed over the sleeve and a biscuit of rubber composition is next molded in the desired shape over the sleeve and the whole vulcanized together in the well known manner of molding rubber or rubber composition on metal. The grooves or threads L formed on the body of the collar intermediate the flanges F and G serve to prevent the creeping of the jacket or band J on the collar. The flanges F and G at the ends of the collar being of substantially corresponding diameter to the end portions of the jacket or band, serve to retain the band in operative position on the collar, and further serve to protect the ends of the band against damage when the coupling and associated pipe sections are being raised from or lowered into a well casing or the like.

In accordance with the patent statutes, I have described the principles of operation of my invention together with the construction which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to secure by Letters Patent is:

1. A protective coupling for tubular sections comprising a metal collar with annular external flanges at either end and a resilient band encompassing and affixed to the collar between and adjacent said flanges, said flanges being formed to substantially cover and protect the ends of said band.

2. A protective coupling for tubular sections comprising a metal collar with annular external flanges at its ends and a resilient band encompassing and affixed to the collar between said flanges, both said flanges being integral with said collar and adapted to substantially cover and protect the ends of said band, said band formed of gradually increasing thickness from its end inwardly to points central of its ends.

3. A protective coupling for tubular sections comprising a metal collar with annular external flanges at both its ends and a resilient band encompassing and affixed to the collar between said flanges, said flanges being of a size to substantially cover and protect the ends of said band, the central portion of said band being of substantially greater diameter than the end portions thereof.

4. A protective coupling for tubular sections comprising a metal collar with annular external flanges at its ends and a resilient band having internal grooves encompassing and affixed to the collar between said flanges, said flanges being of a size to substantially cover and protect the ends of said band, said collar having peripheral grooves formed thereon for receiving the correspondingly formed portions of the band, to prevent creeping of the band on the collar.

5. A coupling comprising a one piece collar having external annular flanges near both its ends and grooves formed on and encircling its periphery intermediate said flanges, and a rubber band vulcanized on to said collar between said flanges and having end portions substantially corresponding in diameter to said flanges.

6. A coupling comprising a collar having external annular flanges near its ends and grooves formed on and encircling its periphery intermediate said flanges, and a rubber band vulcanized on to said collar between said flanges and having end portions substantially corresponding in diameter to said flanges, the central portion of said band being of substantially greater diameter than said end portions.

7. A coupling comprising a collar having external annular flanges near its ends, and a rubber band vulcanized on said collar between said flanges and having end portions of substantially less diameter than the central portion thereof, for the purpose described.

8. A coupling comprising a collar having external annular flanges near its ends, and a rubber jacket or band vulcanized onto the body of the collar intermediate said flanges and having a maximum thickness and diameter at points centrally of said flanges, the end portions of said jacket being of substantially corresponding diameter, but of substantially less diameter and thickness than the central portion of said jacket.

In witness whereof, I have signed my name to this specification.

EDWARD PAUL BARCLAY.